3,332,912
HIGH MOLECULAR WEIGHT POLYMER CONTAINING A CARBOXYLIC ACID AMINE ANTISTATIC AGENT

Fritz Walter Artur Rochlitz, deceased, late of Bad Soden, Taunus, Germany, by Franz Rochlitz, heir, Stuttgart-Degerloch, Germany, and Anneliese Rochlitz, nee Paetsch, heiress, Stuttgart-Degerloch, Germany, and Dietrich Schleede, Frankfurt am Main, and Felix Schülde, Neuenhain, Taunus, Germany, assignors to Farbwerke Hoechst Aktiengesellschaft vormals Meister Lucius & Brüning, Frankfurt am Main, Germany, a corporation of Germany
No Drawing. Filed Dec. 17, 1963, Ser. No. 331,315
Claims priority, application Germany, Dec. 18, 1962, F 38,585
2 Claims. (Cl. 260—67)

The present invention relates to a process for rendering high molecular weight compounds resistant to electrostatic charge.

High molecular weight substances have the disadvantage to accumulate electrostatic charge, particularly if they have good electrical properties. Owing to this electrostatic charging shaped articles made of, or containing, such substances have an increased tendency to attract dust. As a result thereof, the surfaces of such shaped articles exhibit, for example, the well known stains, crow's feet and zigzag designs while fibers and fabrics become dirty within a short time. Besides a pronounced dirtying owing to electrostatic charge, a potential difference which under certain circumstances may be very high and which may give rise to sparking must be taken into consideration. Owing to these disadvantages arising from electrostatic charge the use of high molecular weight substances, for example plastics, may become unattractive for many fields of application.

Besides conditioning, two fundamental methods are known for preventing or reducing the electrostatic charge of high molecular weight compounds:

(1) Rendering shaped articles subsequently resistant to electrostatic charge by impregnation with solutions or dispersions of anti-static agents which are in many cases somewhat hygroscopic.

In this case, the surfaces of the shaped articles made of plastic materials are rendered conductive, that is the surface resistivity is strongly reduced so that electrostatic charge applied to the surface can flow off. The disadvantages of this method of rendering plastic materials resistant to electrostatic charge is obvious: when the conductive layer is damaged or wiped off the antistatic effect is lost, too.

(2) Incorporation of substances that prevent an electrostatic charge of shaped articles made of plastic materials.

This method offers considerable advantages over the above impregnation method. The antistatic effect is not only produced at the surface of the shaped articles and the antistatic layer cannot be wiped off, scratched off or detached mechanically. Attempts to incorporate in the plastic material the anti-static agents used for the impregnation method showed that the said compounds are generally ineffective when incorporated in the plastic material. In some cases this is due to the fact that they are partially or wholly decomposed at the sometimes rather elevated processing temperatures of the plastic materials. However, also compounds that are stable at these temperatures have no anti-static efficacy after incorporation. There is obviously a fundamental difference between the reaction mechanism taking place in the method of rendering shaped articles resistant to electrostatic charge by the above incorporation and the reaction mechanism occurring in the impregnation process. This can also be proved by measurement. While the surface resistivity is strongly reduced by the impregnation with anti-static agents, the surface resistivity is substantially uneffected by the incorporation of anti-static agents even when the latter are very effective. In this case, the electrostatic charge cannot flow off at the surface of the articles, but instead the transmission resistivity is in most cases slightly modified. It has been found that also this method of measurement is not a measure of the resistance to electrostatic charge.

For rendering articles resistant to electrostatic charge by subsequent impregnation, various substances have been proposed. Exemplary of such substances are the following:

(1) nitrogen-containing compounds such as amines and quaternary ammonium salts,
(2) sulfonic acids and aryl-alkyl-sulfonates,
(3) phosphoric acids, aryl-alkyl-phosphates and phosphoric acid ester amides,
(4) polymers of polyhydric alcohols and the derivatives thereof.

As anti-static agents capable of being incorporated in the plastic material strongly hygroscopic inorganic salts have first been known. However, they are generally not used on account of the risk connected therewith of corrosion occurring on the processing machines.

More recently, further compounds have been proposed for incorporation to render high molecular weight organic compounds resistant to electrostatic charge.

It is known, for example, to add substituted phosphoric acid amides, urea derivatives and dithiocarbamates. Part of these compounds are, however, difficult to obtain or their purification requires considerable expenditure.

Now we have found that organic compounds of high molecular weight can be rendered resistant to electrostatic charge by incorporating into the organic compounds of high molecular weight a substituted carboxylic acid amine of the following formula

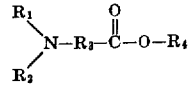

wherein $R_1$ represents H or $CH_3$, $R_2$ represents an alkyl radical having 2 to 26 carbon atoms, advantageously 12 to 26 carbon atoms, $R_3$ represents a linear alkylene biradical having 1 to 5 carbon atoms, which may be substituted by an alkyl, cycloalkyl, aryl, alkylaryl or arylalkyl radical, $R_4$ represents H, an alkyl radical having 1 to 26 carbon atoms or a metal ion, and $R_2$, $R_3$ and $R_4$ may be substituted by a hydroxy group of an alkoxy group.

It has been found that the incorporation of small amounst of such substituted carboxylic acid amines already imparts excellent anti-static properties to organic compounds of high molecular weight so that articles made of such mixtures no longer charge electrostatically at the surface and no longer tend to attract dust.

The concentration of the substituted carboxylic acid amines in the plastic material is advantageously within the range of 0.1 to 7% by weight, advantageously 0.5 to 4% by weight.

It is advantageous to incorporate in the compounds of high molecular weight a mixture of 2 or more of the antistatic substances. In this case the anti-static efficacy may be enhanced by synergistic effects.

Exemplary of anti-static substances to be used in the process of the invention are the following:

Propionic acid ethyl ester-β-N-methyl-stearylamine
Butyric acid stearyl ester-γ-N-methyl-dodecylamine
Propionic acid methyl ester-β-N-methyl-dodecylamine
Propionic acid ethyl ester-β-N-ethanolamine
Valeric acid ethyl ester-δ-N-methyl-ethanolamine.

The mechanical and thermal properties, the thermostability under load as well as color and transparency of the polymers are practically unaltered by the addition of the said substances. The working conditions and the temperature range in which the plastic material can be shaped by a thermoplastic process remain the same. Care has only to be taken that such anti-static substances are chosen as are stable at the temperature at which a plastic material used in a given case is processed.

The products are well compatible with all polymers. The anti-static effect that can be obtained is independent of the moisture of the sourroundings and practically of an unlimited duration. Exudation was not observed. Moreover, the surface does not become hygroscopic but remains unchanged. By the addition of the substances of the general formula described above all high molecular weight materials can be improved that have the tendency of getting dirty by attracting dust owing to electrostatic charging. These compounds exhibit a particularly good efficacy, for example, in polystyrene and in copolymers of styrene with monomers that are copolymerizable with styrene such, for example, as butadiene, acrylonitrile and/or vinyl carbazole, in polyvinyl chloride and vinyl chloride copolymers, polyterephthalates, polyolefins obtained by the high pressure process or the low pressure process (Phillips process or Ziegler process) such, for example, as the polymers and copolymers of ethylene, propylene, butene-(1), pentene-(1), 4-methyl-pentene-(1), hexene-(1), 5,5-dimethyl-hexene-(1), octadecene-(1), 4-phenyl-butene-(1) as well as vinylcyclohexene, polycarbonates, polyoxymethylenes, polyacrylonitrile, polyacrylic acid esters, polymethacrylic acid esters, polyacetates, polyvinyl acetates, polyamides, polyurethanes, cellulose derivatives and mixtures containing the enumerated polymers. Also unsaturated polyesters and epoxy resins hardened with reagents having a basic character as well as raw materials for lacquers can without difficulty be rendered resistant to electrostatic charge prior to or during their processing by an addition of the above mentioned anti-static agents.

The high molecular weight compounds may further contain usual additives, for example stabilizers, fillers and dyestuffs.

The substances to be incorporated in accordance with the invention may be added prior to or during the polymerization and also subsequently to the pulverulent high molecular weight polymer as well as to the granular product. Depending on the nature of the plastic material the said compounds may be admixed in the melt, in solution or by application to the pulverulent or granular high molecular polymer. The admixture is most advantageously effected prior to or during the processing. It was found that the technique of incorporation is of little importance. It is important, however, that the anti-static agents are distributed in the plastic material as uniformly as possible.

The high molecular weight compounds rendered resistant to electrostatic charge by the process of the invention can be processed by all customary processing methods, for example, on molding presses, injection molding machines or extruders. From these high molecular weight polymers, therefore, there can be made compression- and injection molded articles, semi-finished goods, sheets, inflated hollow articles, tubes, fibers, filaments and monofilaments. The resins admixed with the compounds mentioned above can be processed in the usual manner as resin varnish or casting resin or in combination with glass fibers and/or fillers. The high molecular weight polymers which have been rendered resistant to electrostatic charge in this manner are particularly interesting for packaging purposes (packing material, canisters, bottles, breakers), as accessories for vacuum cleaners, band-conveyors, showroom patterns and masters, parts of casings (for example for radio and television sets, vacuum cleaners), electric installations such a lighting fixtures, cable insulations, plugs, switches or armatures, air conditioning and ventilating equipments, plastics table ware, kitchen machinery, filaments, fibers, fabrics, sheets, lacquers, that is in all those cases in which resistance to electrostatic charge is required.

The anti-static effect of inorganic or organic compounds in high molecular weight materials can be determined most easily by means of cigarette ash. For testing these materials plates obtained by extrusion, injection- or compression molding are vigorously rubbed with a woolen cloth for about 15 seconds and held about 2 mm. above a layer of cigarette ash. When the plates have good anti-static properties, they do not attract cigarette ash. Since cigarette ash is somewhat hygroscopic and moist cigarette ash has different electrical properties, the ash used for the test should be not older than 6 hours.

The table given below which lists the test results shows that an excellent anti-static effect can be attained with all of the copounds enumerated.

The following examples serve to illustrate the invention but they are not intended to limit it thereto.

TABLE

| Ex. No. | Plastic Material | Anti-static agent | Formula | Addition in percent | Ash test after 1 and 21 days, respectively |
|---|---|---|---|---|---|
| 1 | Low pressure polyethylene | Propionic acid ethyl ester-β-N-methyl-stearylamine. | $\underset{C_{18}H_{37}}{\overset{CH_3}{\diagdown}}\!\!\!\!\nearrow N-CH_2-CH_2-\overset{O}{\overset{\|}{C}}-OC_2H_5$ | 2 | (¹) |
| 2 | Polypropylene | Butyric acid-stearylester-γ-N-methyl-dodecylamine. | $\underset{C_{12}H_{25}}{\overset{CH_3}{\diagdown}}\!\!\!\!\nearrow N-CH_2-CH_2-CH_2-\overset{O}{\overset{\|}{C}}-OC_{18}H_{37}$ | 1.5 | (¹) |
| 3 | Polystyrene | {Propionic acid methylester-β-N-methyl-dodecylamine. | $\underset{C_{12}H_{25}}{\overset{CH_3}{\diagdown}}\!\!\!\!\nearrow N-CH_2-CH_2-\overset{O}{\overset{\|}{C}}-O-CH_3$ | 1.5 | (¹) |
| 4 | Polyamide | | | 1.0 | (¹) |
| 5 | Polyester resin hardened | Propionic acid ethyl ester-β-N-ethanol-amine. | $\underset{HOC_2H_4}{\overset{H}{\diagdown}}\!\!\!\!\nearrow N-CH_2-CH_2-\overset{O}{\overset{\|}{C}}-OC_2H_5$ | 1.0 | (¹) |
| 6 | Polycarbonate | Valeric acid ethyl ester-δ-N-methyl-ethanolamine. | $\underset{HOC_2H_4}{\overset{CH_3}{\diagdown}}\!\!\!\!\nearrow N-(CH_2)_4-\overset{O}{\overset{\|}{C}}-OC_2H_5$ | 1.0 | (¹) |

¹ No attraction of ash.

The anti-static compounds enumerated in the table and which correspond to the general formula given above were incorporated in various high molecular weight polymers.

What is claimed is:
1. Composition of matter consisting essentially of
   (a) an organic polymeric material of high molecular weight and
   (b) from 0.5 to 4% by weight based on (a) at least one substituted carboxylic acid amine of the formula

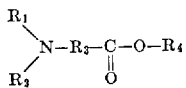

wherein $R_1$ is a member selected from the group consisting of H and $CH_3$,
$R_2$ means alkyl with 2 to 26 carbon atoms,
$R_3$ means a linear alkylene biradical having 1 to 5 carbon atoms, which may be substituted by a member selected from the group consisting of alkyl, cycloalkyl, aryl, alkylaryl and arylalkyl,
$R_4$ is alkyl having 1 to 26 carbon atoms, and $R_2$, $R_3$ and $R_4$ may be substituted by a member selected from the group consisting of hydroxy groups and alkoxy groups.

2. The composition of claim 1, wherein the polymeric material is selected from the group consisting of polystyrene, copolymers of styrene and copolymerizable monomers, homo- and copolymers of vinyl chloride, polyterephthalates, polyolefins, polycarbonates, polyoxymethylenes, polyacrylonitrile, polyacrylates, polymethacrylates, polyacetates, polyvinylacetals, polyamides, polyurethanes, epoxide resins and cellulose polymers.

References Cited
UNITED STATES PATENTS
2,953,526   9/1960   Bergman et al. ------ 252—8.8

WILLIAM H. SHORT, *Primary Examiner.*
SAMUEL H. BLECH, *Examiner.*
R. LYON, *Assistant Examiner.*